(12) United States Patent
Hasegawa et al.

(10) Patent No.: US 8,506,000 B2
(45) Date of Patent: Aug. 13, 2013

(54) STRADDLE TYPE VEHICLE

(75) Inventors: Michiharu Hasegawa, Shizuoka (JP);
Takashi Watanabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1104 days.

(21) Appl. No.: 12/246,322

(22) Filed: Oct. 6, 2008

(65) Prior Publication Data

US 2009/0095113 A1    Apr. 16, 2009

(30) Foreign Application Priority Data

Oct. 10, 2007    (JP) .................................. 2007-264948

(51) Int. Cl.
*B62D 25/14*    (2006.01)

(52) U.S. Cl.
USPC ......................................................... 296/70

(58) Field of Classification Search
USPC ................. 296/70, 71; 114/363, 55.52, 55.57
See application file for complete search history.

(56) References Cited

U.S. PATENT DOCUMENTS

| | | | | |
|---|---|---|---|---|
| D261,752 S | * | 11/1981 | Iwakura .................... | D12/114 |
| D279,975 S | * | 8/1985 | Akira et al. ................ | D12/192 |
| 4,687,072 A | * | 8/1987 | Komuro ..................... | 180/219 |
| 5,067,747 A | * | 11/1991 | Yokoyama ................. | 280/777 |
| 5,174,621 A | * | 12/1992 | Anderson ................... | 296/70 |
| 5,490,474 A | * | 2/1996 | Ikeda .......................... | 114/343 |
| 5,676,216 A | * | 10/1997 | Palma et al. ............... | 180/90 |
| 6,060,985 A | * | 5/2000 | Siviero ....................... | 340/461 |
| 6,158,279 A | * | 12/2000 | Saiki .......................... | 73/493 |
| 6,407,663 B1 | * | 6/2002 | Huggett ..................... | 340/461 |
| 6,497,300 B2 | * | 12/2002 | Mori et al. ................. | 180/219 |
| 6,616,165 B2 | * | 9/2003 | Tsuji ......................... | 280/288.4 |
| 6,675,730 B2 | * | 1/2004 | Simard et al. ............. | 114/55.52 |
| 6,688,175 B2 | * | 2/2004 | Ogura et al. ............... | 73/493 |
| D528,055 S | * | 9/2006 | Komiya et al. ............ | D12/192 |
| 7,325,853 B2 | * | 2/2008 | Tsukui et al. .............. | 296/78.1 |
| D567,715 S | * | 4/2008 | Brew et al. ................. | D12/110 |
| 7,469,947 B2 | * | 12/2008 | Yamaguchi et al. ....... | 296/24.34 |
| 7,546,829 B2 | * | 6/2009 | Samoto et al. ............. | 123/399 |
| D600,373 S | * | 9/2009 | Brew et al. ................. | D26/28 |
| 7,658,253 B2 | * | 2/2010 | Shimizu ..................... | 180/219 |
| 7,677,771 B2 | * | 3/2010 | Yamamoto et al. ........ | 362/474 |
| 7,681,681 B2 | * | 3/2010 | Satake et al. .............. | 180/219 |
| 7,681,901 B2 | * | 3/2010 | LaCour ..................... | 280/288.4 |
| 7,699,010 B2 | * | 4/2010 | Spade et al. ................ | 114/55.57 |

(Continued)

FOREIGN PATENT DOCUMENTS

| | | |
|---|---|---|
| JP | 2000128052 A | 5/2000 |
| JP | 2001114170 A | 4/2001 |
| JP | 2002362460 A | 12/2002 |
| JP | 2006-103361 | 4/2006 |

OTHER PUBLICATIONS

European Search Report for corresponding European application 08017829.6.

*Primary Examiner* — Kiran B Patel
(74) *Attorney, Agent, or Firm* — Keating & Bennett, LLP

(57) ABSTRACT

A straddle-type vehicle having a display with improved operability and visibility includes a display portion representative of a vehicular state and a display operating portion for switching a display on the display portion. The display operating portion is separated from the display portion. The display portion is arranged rearwardly of a steering handle, and the display operating portion is arranged between the steering handle and the display portion.

4 Claims, 16 Drawing Sheets

(56) References Cited

U.S. PATENT DOCUMENTS

| | | | |
|---|---|---|---|
| 7,731,238 B2 * | 6/2010 | Otsubo et al. | 280/835 |
| 7,743,864 B2 * | 6/2010 | Tweet | 180/89.1 |
| 7,748,746 B2 * | 7/2010 | Beiber Hoeve et al. | 280/835 |
| 7,766,360 B2 * | 8/2010 | Saitou et al. | 280/288.4 |
| 7,837,003 B2 * | 11/2010 | Tsutsumikoshi et al. | 180/444 |
| 7,900,733 B2 * | 3/2011 | Miyabe | 180/219 |
| 2001/0028176 A1 * | 10/2001 | Suzuki et al. | 296/70 |
| 2003/0052482 A1 * | 3/2003 | Yamaguchi et al. | 280/833 |
| 2003/0221890 A1 * | 12/2003 | Fecteau et al. | 180/210 |
| 2004/0104062 A1 * | 6/2004 | Bedard et al. | 180/190 |
| 2006/0072331 A1 | 4/2006 | Yamaguchi et al. | |
| 2007/0144806 A1 * | 6/2007 | Mochizuki et al. | 180/219 |
| 2008/0099266 A1 * | 5/2008 | Hiroi et al. | 180/219 |
| 2008/0100086 A1 * | 5/2008 | Vermeersch et al. | 296/70 |
| 2008/0158901 A1 * | 7/2008 | Mochizuki | 362/538 |
| 2009/0021582 A1 * | 1/2009 | Nakaya | 348/148 |
| 2009/0038871 A1 * | 2/2009 | Inomori et al. | 180/219 |
| 2009/0078492 A1 * | 3/2009 | Tsutsumikoshi et al. | 180/443 |
| 2009/0261612 A1 * | 10/2009 | Takayama et al. | 296/70 |

* cited by examiner

STRADDLE TYPE VEHICLE

CROSS REFERENCE TO RELATED APPLICATIONS

This application claims the benefit of priority under 35 USC 119 of Japanese patent application no. 2007-264948, filed on Oct. 10, 2007, which application is hereby incorporated by reference in its entirety.

BACKGROUND OF THE INVENTION

1. Field of the Invention

The present invention relates to a straddle-type vehicle having a display portion representative of a vehicular state and a display operating portion for switching a display on the display portion.

2. Description of Related Art

Some motorcycles have a display representative of various vehicular states such as travel distance, fuel reserves, cooling water temperature, hydraulic pressure, etc. JP-A-2006-103361 proposes a display, for example, in which a display portion comprising a liquid crystal display and a display operating portion for manually switching a display on the display portion are united and arranged on a fuel tank forwardly of a seat.

In a conventional display, the display portion and the display operating portion are arranged concentratedly, so that the operating portion is formed small to some extent. An operator wearing relatively thick gloves or the like may have a problem operating the display operating portion, and the display portion may be hidden by the operator's gloves or the like to decrease operability and visibility.

SUMMARY OF THE INVENTION

The invention addresses these problems and provides a straddle-type vehicle with a display having improved operability and visibility. The straddle-type vehicle comprising a steering handle, a display portion representative of a vehicular state, and a display operating portion for switching a display on the display portion. The operating portion is arranged rearwardly of the steering handle, and the display operating portion is arranged between the steering handle and the display portion.

With the straddle-type vehicle according to the invention, since the operating portion is arranged rearwardly of the steering handle and the display operating portion is arranged between the steering handle and the display portion, a spatial margin is generated, so that the display operating portion can have a relatively large or non-interfering shape, thus improving operability. Also, the display portion is positioned below a driver and not hidden by gloves or the like when the driver reaches for and operates the display operating portion, thus improving visibility.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
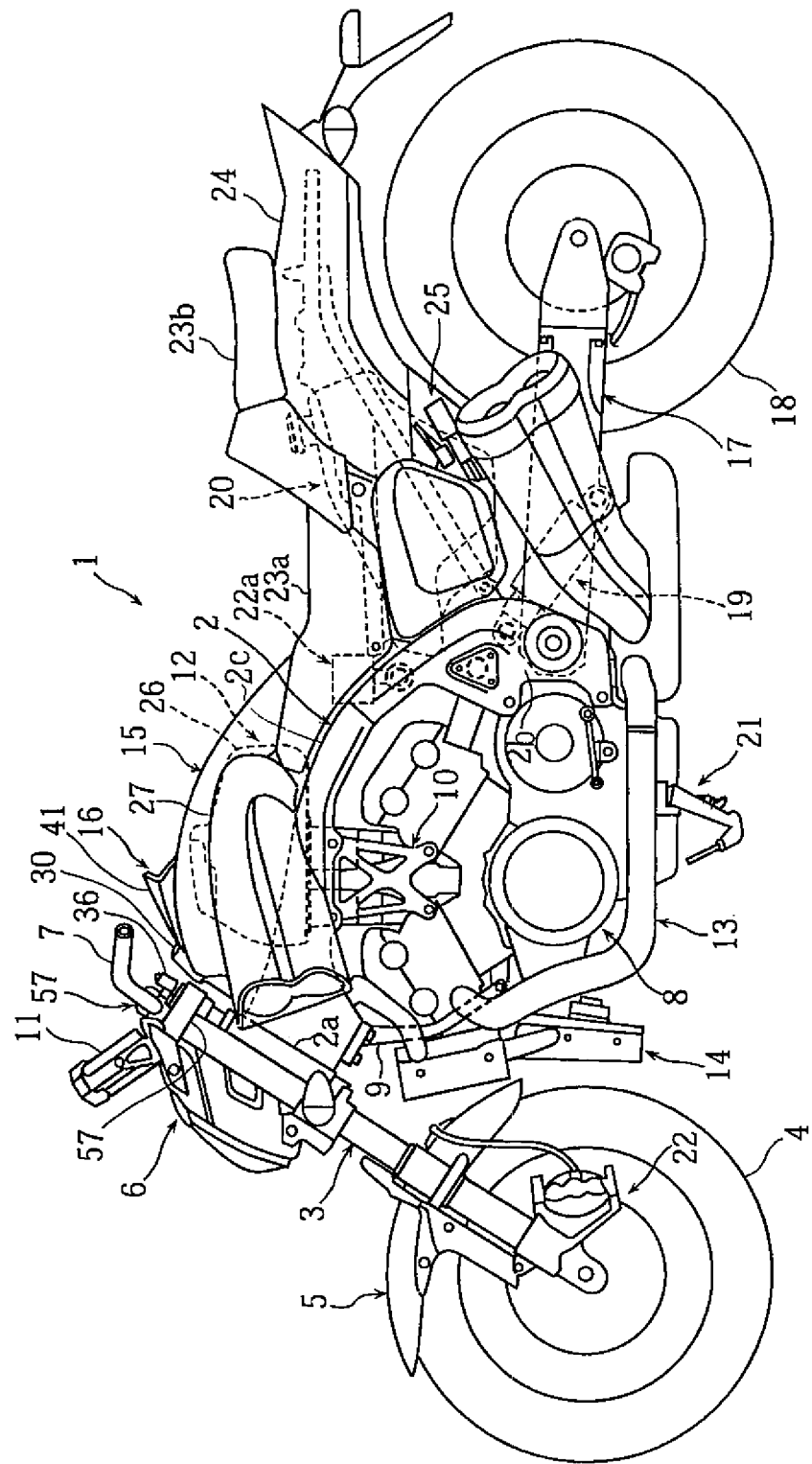
FIG. 1 is a side view of a motorcycle (straddle-type vehicle) according to an embodiment of the invention.
Figure 2:
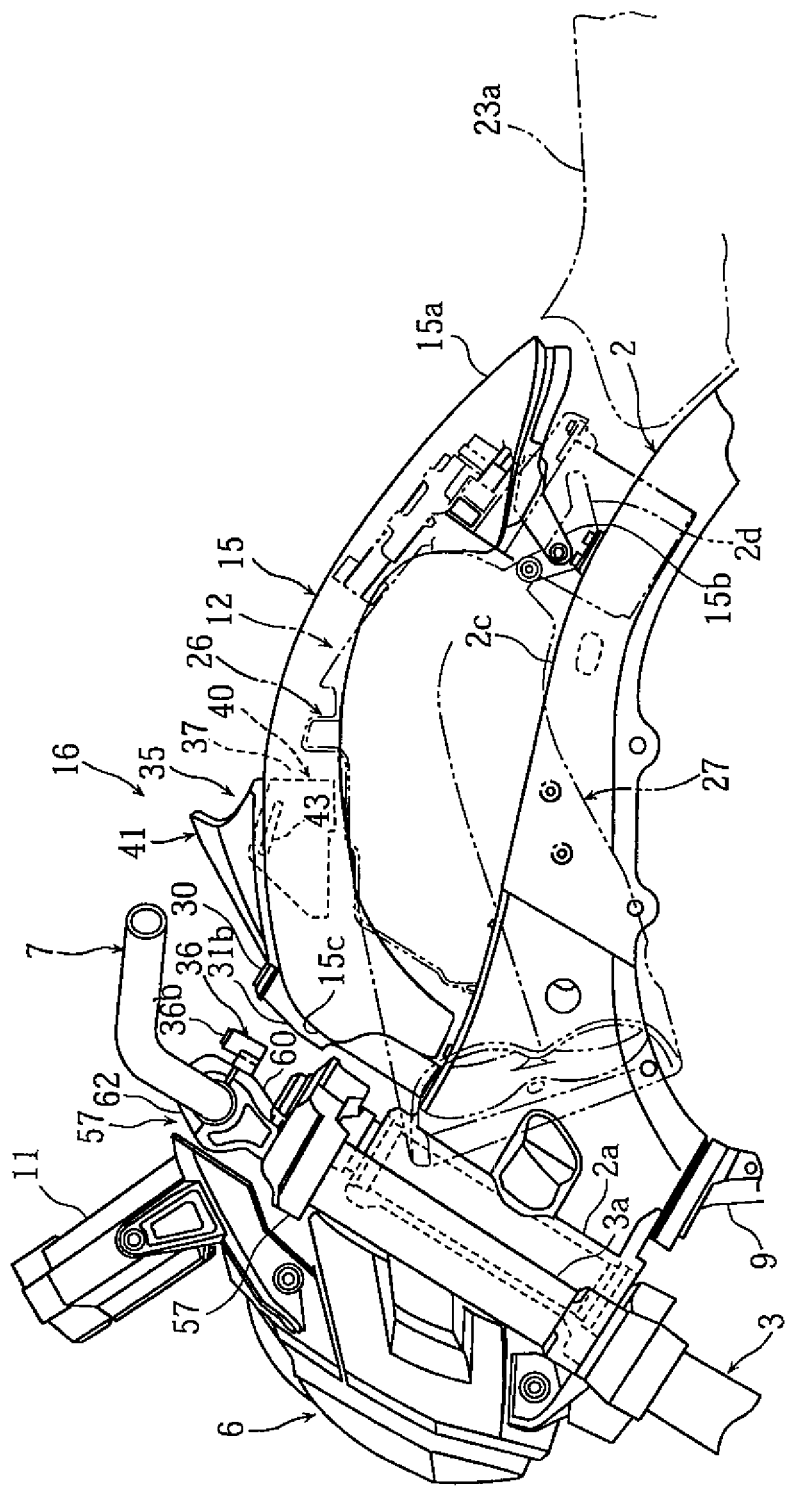
FIG. 2 is a side view of a display arranged on the motorcycle.
Figure 3:
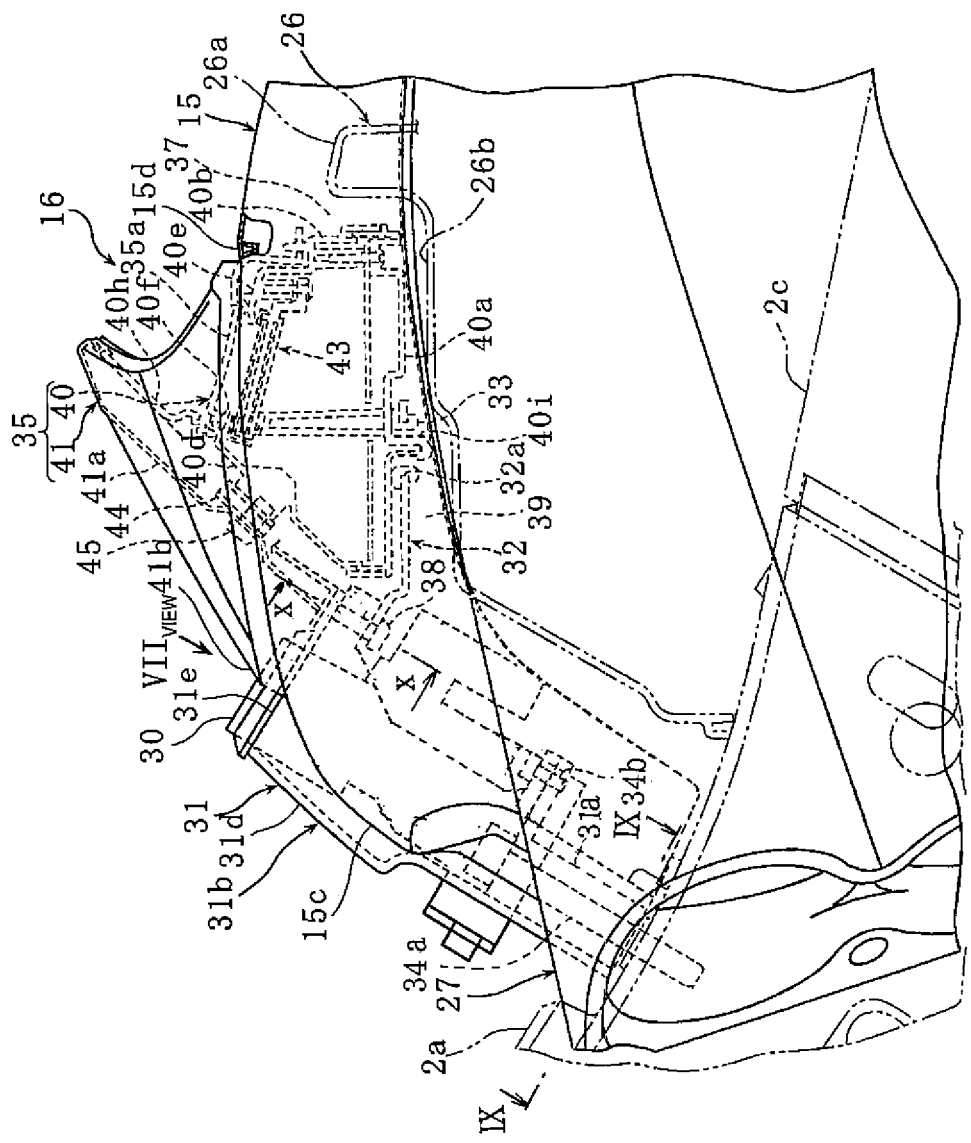
FIG. 3 is a side view of a display portion of the display.

An embodiment of the invention is described below with reference to the accompanying drawings.

FIGS. 1-16 illustrate a motorcycle 1 (straddle-type vehicle) according to an embodiment of the invention. In the following description, front and rear, and left and right are directions from the perspective of a rider seated on the seat, unless otherwise specified.

Motorcycle 1 includes a head pipe 2*a* positioned at a front end of a body frame 2 that supports a front fork 3 to be steerable left and right. A front wheel 4 is journaled at a lower end of front fork 3. An upper portion of front wheel 4 is covered by a front fender 5 that is mounted to a lower portion of front fork 3.

A headlight device 6 is arranged on an upper portion of front fork 3 and a steering handle 7 is fixed at an upper end thereof. A circular-shaped meter 11 having a speedometer, a tachometer, etc. is mounted to headlight device 6 and positioned forwardly of steering handle 7.

An engine unit 8 is suspended from and supported on body frame 2 by a front suspension bracket 9, a central suspension bracket 10, and left and right rear arm bracket portions 2*b* of body frame 2. An intake device 12 and an exhaust device 13 are connected to engine unit 8, and a radiator device 14 is arranged forwardly of engine unit 8. Intake device 12 is covered from above by a frame cover 15 arranged on a front portion of body frame 2, and a display 16 representative of a vehicular state is arranged on frame cover 15.

A side stand device 21 is arranged on a left wall lower portion of engine unit 8 to cause motorcycle 1 to remain upright in a slightly leftwardly inclined state.

A rear arm 17 is supported by rear arm bracket portions 2*b* to be able to swing vertically and a rear wheel 18 is journaled by a rear end of rear arm 17. Rear wheel 18 and front wheel 4 are braked by a hydraulic type braking device 22. A rear-wheel suspension device 19 is arranged between rear arm 17 and arm bracket portions 2b and is provided with a remote-type operating characteristic adjustment mechanism 25. A fuel tank 20 is arranged above rear-wheel suspension device 19, and a hydraulic control unit 22a of braking device 22 is arranged obliquely forwardly of fuel tank 20.

A straddle-type main seat 23a covers upper portions of hydraulic control unit 22a and fuel tank 20. A rear fender 24 covers rear wheel 18 from above and is arranged below a tandem seat 23b arranged rearwardly of main seat 23a.

Body frame 2 includes left and right main frame portions 2c extending rearward and obliquely downward from head pipe 2a while diverging outward in a vehicle width direction. Left and right rear arm bracket portions 2b are contiguous to main frame portions 2c and extend downward.

Intake device 12 includes an air cleaner 26 arranged between main frame portions 2c, and an intake duct 27, through which travel wind is introduced into air cleaner 26, arranged along outer side surfaces of main frame portions 2c.

Frame cover 15 is made of a sheet metal and bulges upward from an upper edge of intake duct 27 as viewed from laterally of motorcycle 1. Frame cover 15 covers main frame portions 2c and air cleaner 26 from above.

A rear wall portion 15a of frame cover 15 is mounted to body frame 2 and a front wall portion 15c is mounted to a switch cover 31b described later and has the following mount structure. Left and right stays 15b are formed on left and right edges of rear wall portion 15a of frame cover 15 to project downward. Stays 15b are bolted and fixed to frame brackets 2d provided on upper surfaces of main frame portions 2c (FIG. 2), such that frame cover 15 is positioned relative to body frame 2 in a longitudinal direction and in the vehicle width direction.

Figure 7:
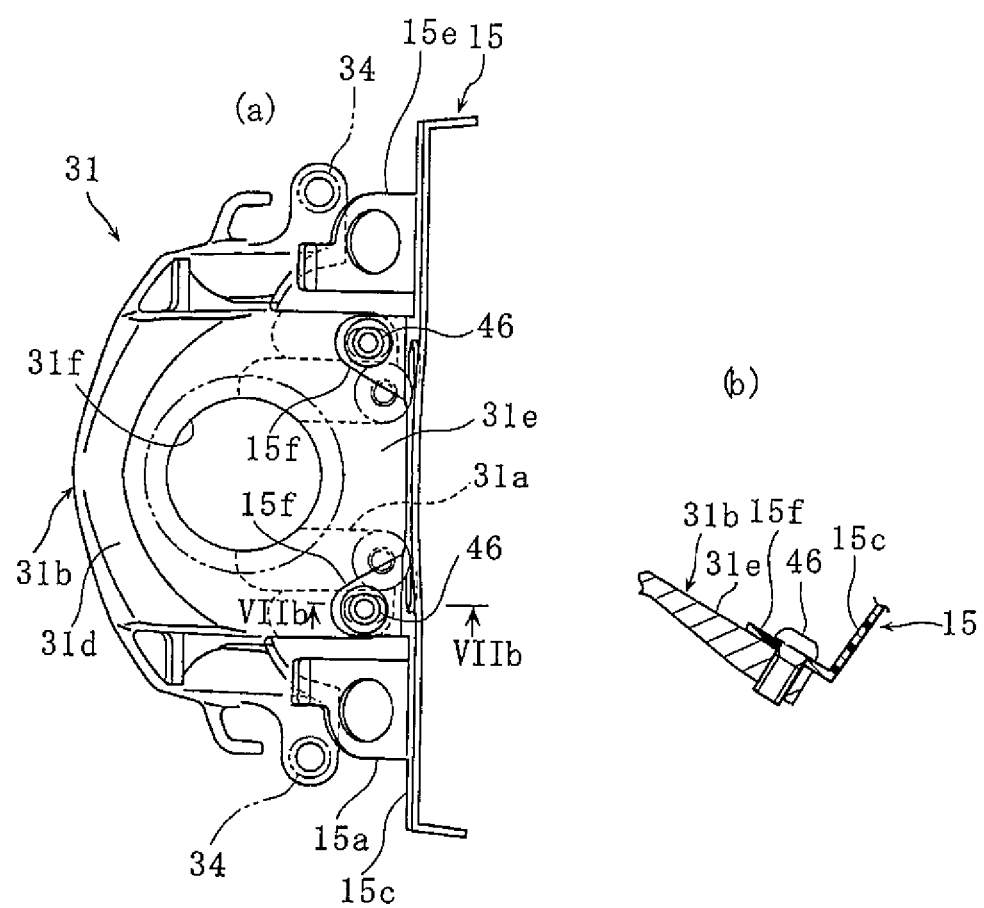
FIG. 7 is a view of a main switch of the motorcycle.
Figure 8:
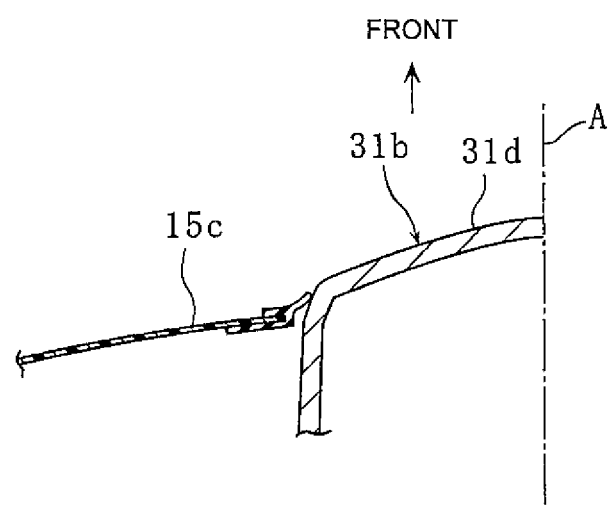
FIG. 8 is a cross sectional view taken along line VIII-VIII of FIG. 4 showing a switch cover of the main switch.
Figure 9:
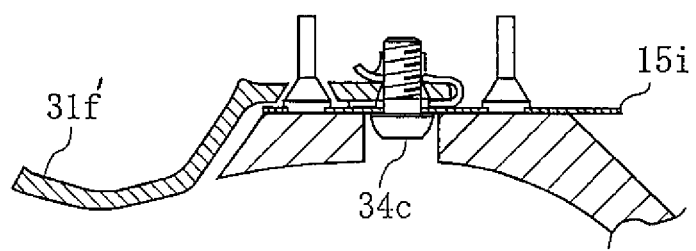
FIG. 9 is a cross sectional view taken along line IX-IX of FIG. 3 showing the joint relationship between the switch cover and a frame cover.

Left and right flange portions 15f are formed on left and right edges of front wall portion 15c of frame cover 15 to project forward. Flange portions 15f are mounted to an upper wall portion 31e of the switch cover 31b by fixation bolts 46 (FIG. 7). Flange portions 15f and switch cover 31b can be regulated in a mount position by a slot.

A main switch 30 enters into front wall portion 15c of frame cover 15 and is positioned in the vicinity of a rear side of head pipe 2a, as viewed from laterally of motorcycle 1. In other words, a major part of main switch 30 is covered by frame cover 15 as viewed from laterally of motorcycle 1.

Figure 11:
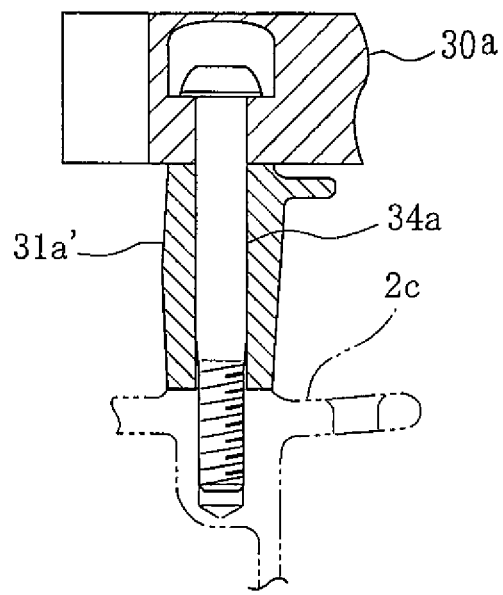
FIG. 11 is a cross sectional view taken along line XI-XI of FIG. 4 showing a state, in which a switch bracket of the main switch is joined to a body frame.
Figure 12:
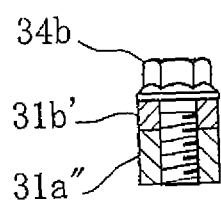
FIG. 12 is a cross sectional view taken along line XII-XII of FIG. 4 showing a state, in which a switch bracket of the main switch is joined to the switch cover.

Main switch 30 is mounted to body frame 2 through a switch bracket 31a, and front, left and right portions of switch bracket 31a and main switch 30 are covered by a switch cover 31b. More specifically, left and right mounts 31a' of switch bracket 31a and a bottom portion 30a of main switch 30 are clamped and fixed together to upper surfaces of connections to head pipe 2a of body frame 2 by bolts 34a (FIG. 11). Left and right flange portions 31b' of switch cover 31b are fixed to left and right flange portions 31a" of switch bracket 31a by bolts 34b.

Switch cover 31b includes a front wall portion 31d that covers front portions of switch bracket 31a and main switch 30, and an upper wall portion 31e extending rearward from an upper edge of front wall portion 31d. Upper wall portion 31e is formed with a switch opening 31f that covers an outer peripheral surface of main switch 30. A front, lower end surface 15i of frame cover 15 is fixed to left and right lower ends 31f of switch cover 31b by bolts 34c.

Figure 13:
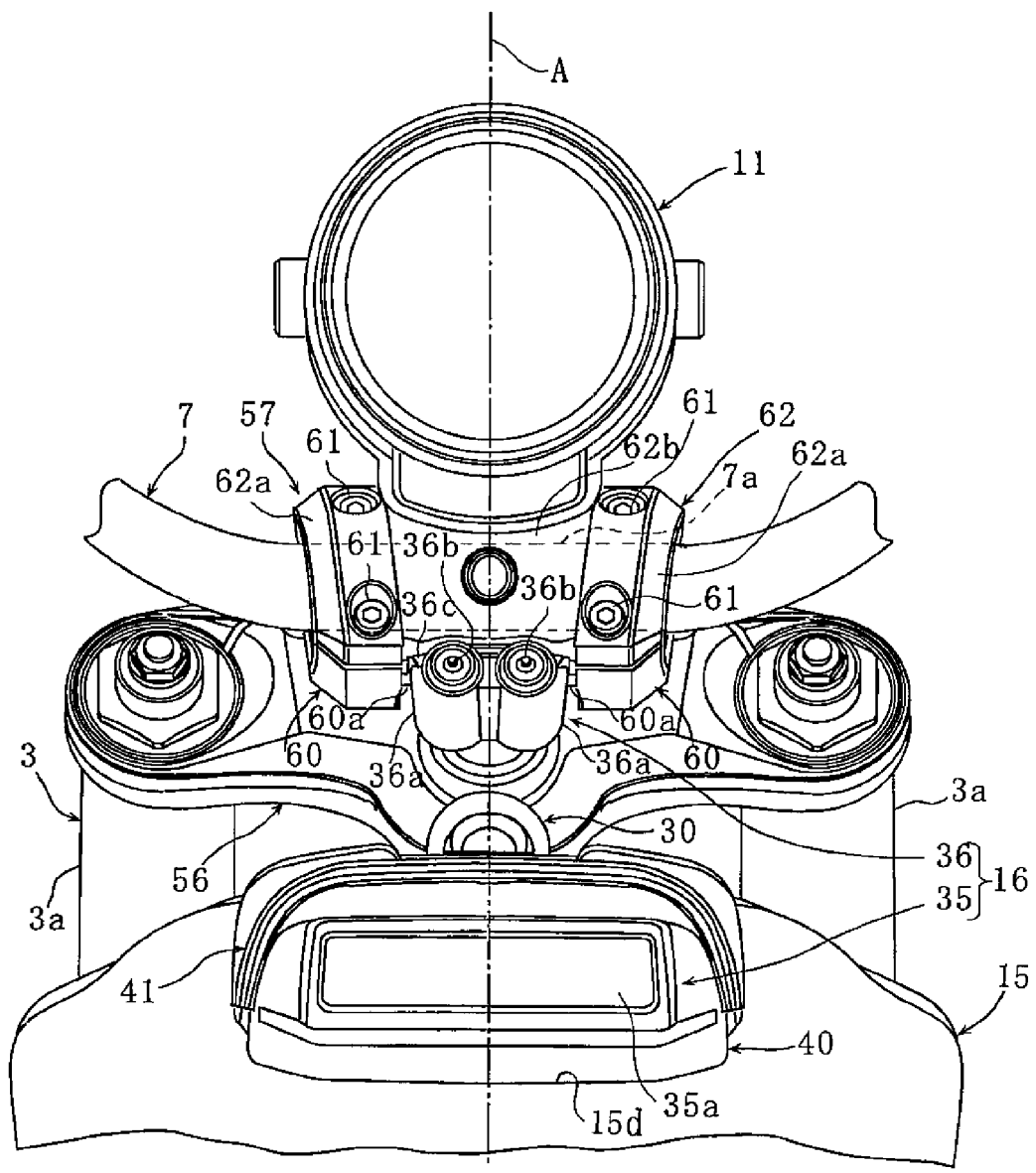
FIG. 13 is a perspective view of a display operating portion of the display as seen from a driver.
Figure 14:
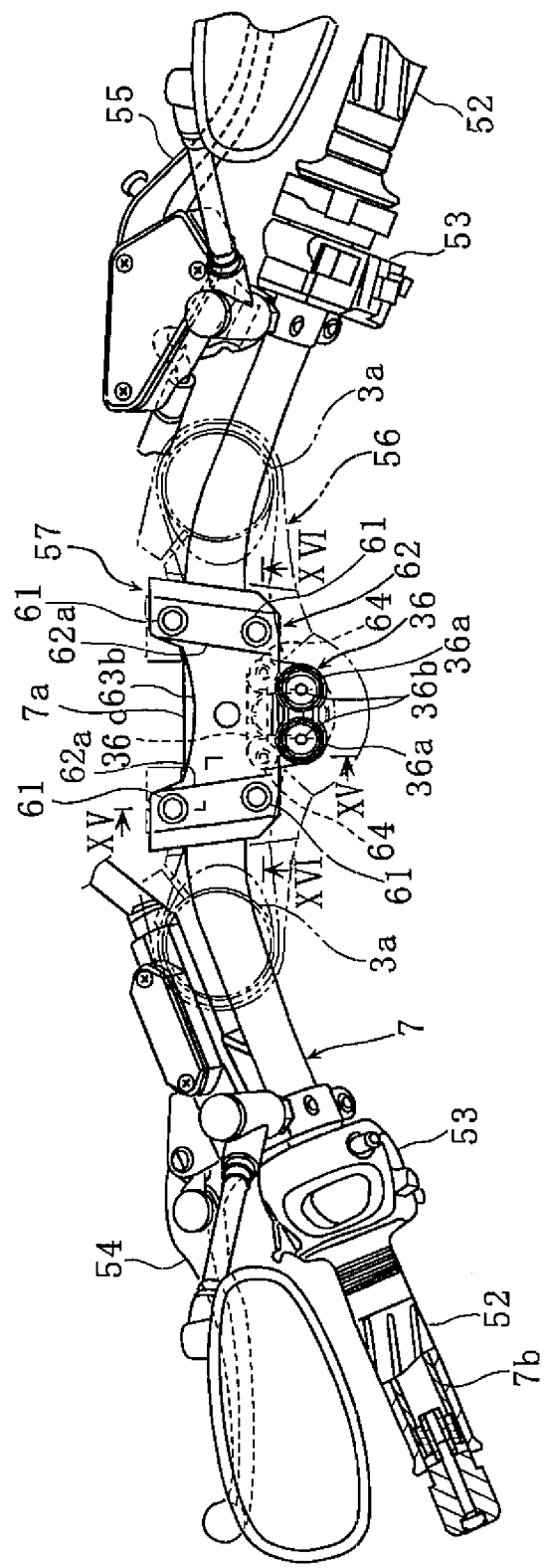
FIG. 14 is a perspective view of the display operating portion.

Display 16 includes a display portion 35 representative of various vehicular states such as travel distance, fuel reserves, cooling water temperature, etc., and a display operating portion 36 for manually switching a display on display portion 35. Display portion 35, display operating portion 36, main switch 30, and meter 11 are arranged on a vehicle center line A (FIG. 13).

Display portion 35 is arranged in a space 37 between frame cover 15 and air cleaner 26 arranged below frame cover 15. Display portion 35 is arranged in a downwardly dented recess 26b formed on an upper wall portion 26a of air cleaner 26. Display portion 35 is arranged in an opening 15d formed centrally of frame cover 15 in the vehicle width direction so that a display surface 35a of display portion 35 can be seen by a driver.

Display portion 35 includes a display body 40 and a pent roof member 41 mounted to display body 40 to shield light incident from the front of and above motorcycle 1. Display body 40 includes a bottom portion 40a arranged in frame cover 15 and positioned in recess 26b of air cleaner 26 and a substantially box-shaped lid portion 40b mounted water-tightly to bottom portion 40a.

Figure 4:
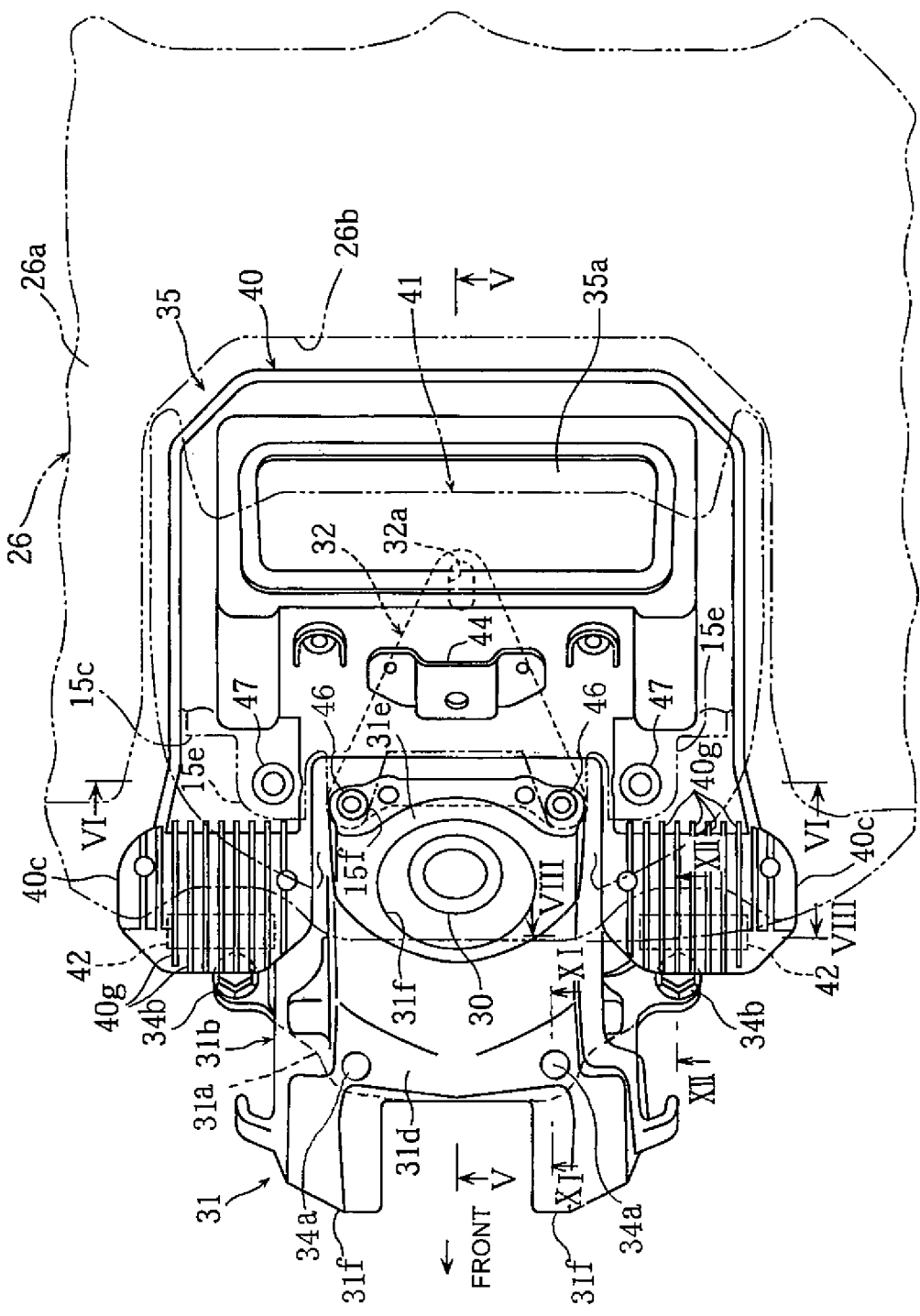
FIG. 4 is a plan view of the display portion.

Display body 40 includes left and right extensions 40c extending toward the front of motorcycle 1 in a manner to cover left and right sides of switch cover 31b. Couplers 42, to which an external harness (not shown) is connected, are arranged in extensions 40c. A multiplicity of reinforcement ribs 40g that increase the stiffness of extensions 40c are formed on outer surfaces of extensions 40c to extend in the extension (longitudinal) direction (FIG. 4).

Lid portion 40b includes a forwardly inclined wall 40d inclined forwardly downward and a rearwardly inclined wall 40e inclined rearwardly downward. A rectangular-shaped display opening 40f is formed on rearwardly inclined wall 40e and is covered by a transparent plate that constitutes display surface 35a. A plate-shaped shielding portion 40h extending rearward and obliquely upward is formed on a front edge of display opening 40f.

Display body 40 includes a display plate 43 having an EL (electroluminescence) display 43a that emits light upon application of voltage, and a base plate 43b supporting display plate 43. Display plate 43 is arranged on display opening 40f in lid portion 40b and mounted to lid portion 40b.

Pent roof member 41 covers display body 40 from above and covers opening 15d of frame cover 15 from the front and above. Pent roof member 41 projects upward from an upper surface of frame cover 15 and is inclined rearwardly upward as viewed from laterally of motorcycle 1. A front end 41b of pent roof member 41 overlaps main switch 30.

A key insertion recess 41a surrounding a lower edge of main switch 30 is formed centrally of pent roof member 41 in the vehicle width direction. Thereby, a driver can see main switch 30 through key insertion recess 41a. Key insertion recess 41a is fixed to forwardly inclined wall 40d of display body 40 by a mount bolt 45. More specifically, a substantially hat-shaped mount plate 44 is bolted and fixed to forwardly inclined wall 40d and pent roof member 41 is mounted to mount plate 44. Mount bolt 45 is positioned in key insertion recess 41a such that it is hard to see laterally in the vehicle width direction. In addition, shielding portion 40h of display body 40 registers positionally with a moor member 50 bonded to a rear edge portion 41c of pent roof member 41.

Display body 40 is mounted to frame cover 15 and switch cover 31b and has the following mount structure. A support plate 32 that is substantially triangular-shaped as viewed in plan view is mounted to a rear edge of upper wall portion 31e of switch cover 31b by left and right bolts 38 inserted from under. Support plate 32 is arranged with a clearance 39 between it and recess 26b of air cleaner 26 and extends to a position where it overlaps recess 26b.

A slot 32a that is lengthy in a longitudinal direction is formed at a rear end of support plate 32. A grommet 33 comprising an elastic member formed along slot 32a is mounted to slot 32a.

A downwardly projecting pawl portion 40i is formed on bottom portion 40a of display body 40. Pawl portion 40i is inserted into grommet 33 to be movable in a longitudinal direction and immovable in the vehicle width direction. Pawl portion 40i is positioned close to a center G of gravity of display body 40. Nuts 47 are insert-molded rearwardly of reinforcement ribs 40g of extensions 40c of display body 40.

Figure 5:
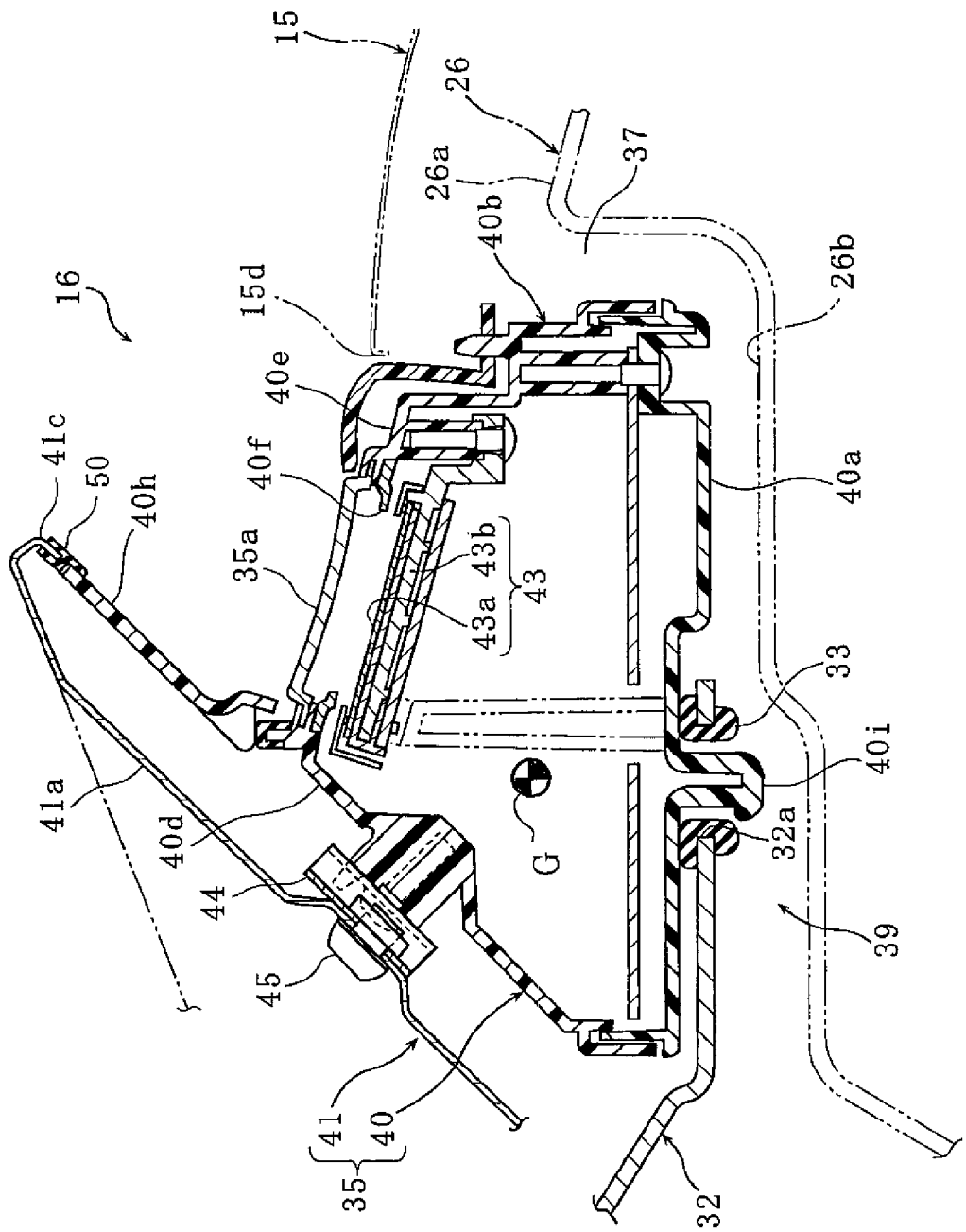
FIG. 5 is a cross sectional view taken along line V-V of FIG. 4 showing the display portion.
Figure 6:
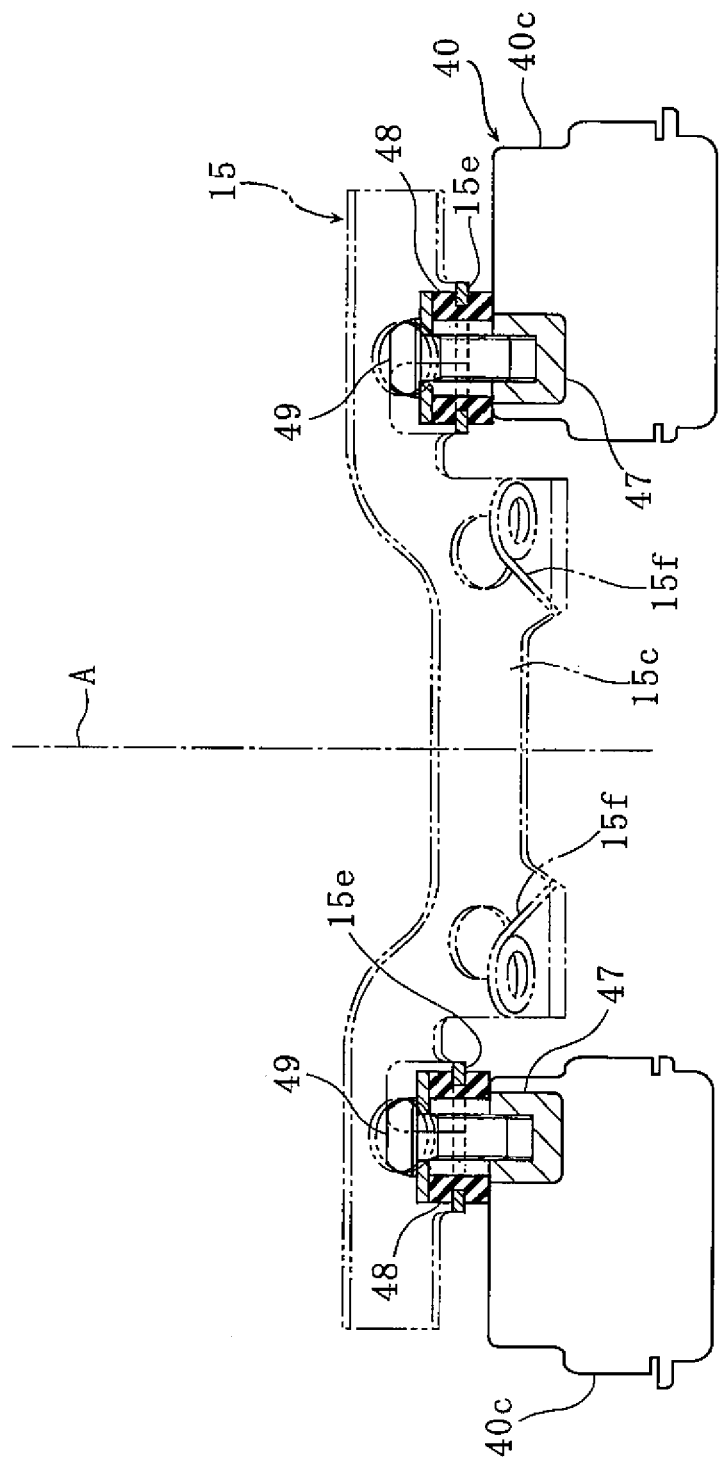
FIG. 6 is a cross sectional, front view taken along line VI-VI of FIG. 4 showing a mount of the display portion.

Left and right mount flange portions 15e formed on a lower edge of front wall portion 15c of frame cover 15 project forward and are positioned outwardly of left and right flange portions 15f in the vehicle width direction. Display body 40 is fixed to flange portions 15e of frame cover 15 with cover grommets 48 therebetween by bolts 49 in a state in which pawl portion 40i is inserted into grommet 33 of support plate 32 to be adjustable in position in the longitudinal direction (FIGS. 5 and 6). Thereby, display portion 35 has the neighbor of its center G of gravity supported by support plate 32 with grommet 33 therebetween and has its left and right, front ends supported by frame cover 15 with cover grommets 48 therebetween.

Display operating portion 36 is formed separately from display portion 35 and arranged between steering handle 7 and display portion 35. Display operating portion 36 is structured such that left and right, cylindrical-shaped operating bodies 36a are made integral. Operational switches 36b are arranged on upper surfaces of operating bodies 36a. When operational switches 36b are pushed, a display represented on display body 40 is switched.

Figure 10:
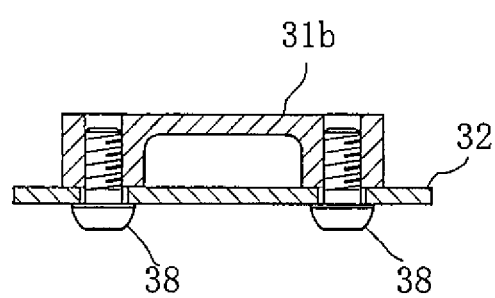
FIG. 10 is a cross sectional view taken along line X-X of FIG. 3 showing the joint relationship between the switch cover and a bracket.

Display operating portion 36 is arranged on a central portion 7a of steering handle 7 in the vehicle width direction and has the following mount structure. Steering handle 7 is made of a pipe material extending in the vehicle width direction, left and right grips 52 are mounted to left and right ends 7b of steering handle 7, and switch boxes 53 are arranged inside grips 52. A clutch lever 54 and a front brake lever 55, respectively, are arranged forwardly of left and right grips 52 (FIG. 10).

Upper ends of left and right fork bodies 3a of front fork 3 are joined together by a handle crown 56. A handle holder 57 is mounted to handle crown 56 and holds central portion 7a of steering handle 7 in the vehicle width direction.

Handle holder 57 includes a pair of left and right lower holders 60 mounted to handle crown 56 and upper holders 62 mounted detachably to lower holders 60. Steering handle 7 is interposed by holding holes formed on mating surfaces 57a of upper holders 62 and lower holders 60. Lower holders 60 are fixed to an upper surface of handle crown 56 by insertion bolts 59 inserted into handle crown 56 from under with rubber bushes 58 therebetween. Upper holders 62 include left and right holder portions 62a opposed to left and right lower holders 60, and connections 62b for connection of left and right holder portions 62a. Holder portions 62a are fixed to lower holders 60 by a pair of front and rear clamping bolts 61.

Display operating portion 36 is mounted detachably to lower holders 60. Inwardly projecting projections 60a are formed stepwise on inner walls of lower holders 60 to be positioned below upper surfaces 60b of lower holders 60. Forwardly projecting mounts 36c are formed on operating bodies 36a of display operating portion 36. Mounts 36c are fixed to projections 60a of holders 60 by mount bolts 64 inserted from above.

Display operating portion 36 is mounted to lower holders 60 before steering handle 7 is mounted, and upper holders 62 are mounted after display operating portion 36 is mounted. Mounts 36c are positioned below connections 62b of upper holders 62 so that upper portions of mounts 36c are covered and hidden by connections 62b, and are difficult to see from above. Left and right sides of mounts 36c are covered and hidden by left and right lower holders 60.

Figure 15:
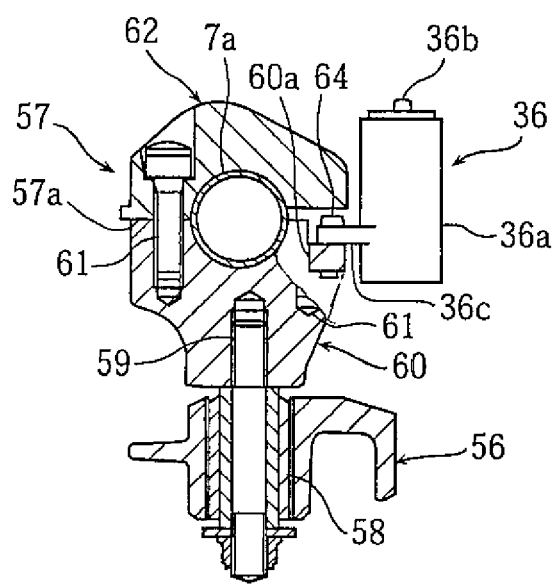
FIG. 15 is a cross sectional view taken along line XV-XV of FIG. 13 showing a hand holder, on which the display operating portion is arranged.
Figure 16:
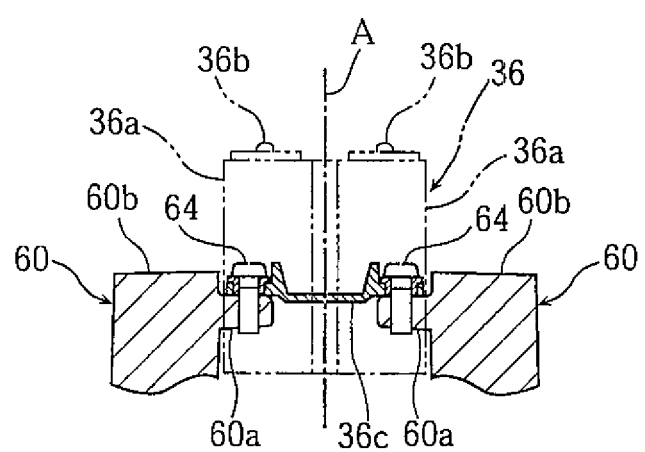
FIG. 16 is a cross sectional view taken along line XVI-XVI of FIG. 13 showing the hand holder.

Operational switches 36b on display operating portion 36 are positioned above mating surfaces 57a of lower holders 60 and upper holders 62 and are arranged in positions substantially flush with upper surfaces of upper holders 62 (FIG. 15).

According to the embodiment, since display operating portion 36 for manual switching of the display is formed separately from display portion 35, display portion 35 is arranged rearwardly of steering handle 7, and display operating portion 36 is arranged between steering handle 7 and display portion 35, display portion 35 is positioned below a driver in a state in which the driver reaches and operates display operating portion 36, so that it is possible to operate display operating portion 36 and confirm the display by display portion 35 without mutual interference, thus improving operability and visibility.

Since display operating portion 36 is arranged on central portion 7a of steering handle 7 in the vehicle width direction, display operating portion 36 makes use of the empty space around the handle, thus further heightening operability.

According to the embodiment, since display portion 35 is arranged centrally in the vehicle width direction of frame cover 15, which covers body frame 2 from above, a driver is able to visibly recognize the display.

Since display portion 35 includes pent roof member 41 extending rearward and obliquely upward, light incident from the front of and above motorcycle 1 is shielded, thus further heightening the visibility of the display.

According to the embodiment, since display operating portion 36 is supported by handle holder 57, which is a part of high stiffness, mounted to handle crown 56, which is also a part of high stiffness, the support strength and stiffness required for display operating portion 36 is ensured.

Since display operating portion 36 is mounted detachably to lower holders 60 of handle holder 57, display operating portion 36 is mounted in a relatively concealed location, thus preventing degradation in outward appearance.

According to the embodiment, since mounts 36c of display operating portion 36 are positioned below and covered and hidden by upper holders 62, degradation in outward appearance is prevented.

According to the embodiment, since operational switches 36b on display operating portion 36 are positioned above mating surfaces 57a of lower holders 60 and upper holders 62, operational switches 36b are positioned for easy operation by a driver, thus facilitating operability.

While a motorcycle has been described as an embodiment of the invention, the invention is also applicable to other vehicles, such as motor tricycles, motor four-wheel cars, straddle-type vehicles for terrain traveling, etc., on which a straddle-type main seat is mounted.

The invention claimed is:

1. A straddle-type vehicle comprising:
   a steering handle;
   a display portion arranged to display a vehicular state of the vehicle; and
   a display operating portion to switch a display of the vehicular state on the display portion to a display of another vehicular state on the display portion; wherein the display operating portion is arranged rearwardly, in a vehicle length direction, of a forward-most portion of the steering handle, and the display operating portion is arranged between the forward-most portion of the steering handle and the display portion in the vehicle length direction, the straddle-type vehicle further comprising:

a handle crown that connects left and right fork bodies, and a handle holder mounted to the handle crown to hold the steering handle, and wherein the display operating portion is mounted to the handle holder.

2. The straddle-type vehicle according to claim 1, wherein the handle holder includes a lower holder mounted to the handle crown and an upper holder mounted detachably to the lower holder, and the display operating portion is mounted detachably to the lower holder.

3. The straddle-type vehicle according to claim 2, wherein a mount of the display operating portion mounted to the lower holder is positioned below the upper holder.

4. The straddle-type vehicle according to claim 2, wherein the display operating portion includes an operational switch that is positioned above a mating surface of the lower holder and the upper holder.

\* \* \* \* \*